(12) United States Patent
Marrow

(10) Patent No.: US 7,978,797 B2
(45) Date of Patent: *Jul. 12, 2011

(54) METHOD AND SYSTEM FOR NEAR OPTIMAL ITERATIVE DETECTION OF THE 2-DIMENSIONAL ISI CHANNEL

(75) Inventor: Marcus Marrow, Santa Clara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/478,179

(22) Filed: Jun. 4, 2009

(65) Prior Publication Data

US 2009/0296804 A1    Dec. 3, 2009

Related U.S. Application Data

(63) Continuation of application No. 11/001,956, filed on Nov. 30, 2004, now Pat. No. 7,564,933.

(51) Int. Cl.
*H03K 5/01* (2006.01)
*H03K 6/04* (2006.01)
*H03D 1/04* (2006.01)
*H03D 1/06* (2006.01)
*H04B 1/10* (2006.01)
*H04L 1/00* (2006.01)
*H04L 25/08* (2006.01)

(52) U.S. Cl. ........ 375/346; 375/230; 375/231; 375/232; 375/233; 375/348

(58) Field of Classification Search ............. 375/230, 375/231, 232, 233, 346, 348
See application file for complete search history.

(56) References Cited

U.S. PATENT DOCUMENTS

| 5,181,198 | A | * | 1/1993 | Lechleider | 370/286 |
| 5,965,195 | A | * | 10/1999 | Muller et al. | 427/155 |
| 6,144,711 | A | * | 11/2000 | Raleigh et al. | 375/347 |
| 6,690,739 | B1 | | 2/2004 | Mui | |
| 6,859,508 | B1 | * | 2/2005 | Koyama et al. | 375/348 |

OTHER PUBLICATIONS

Iterative Detection of 2-Dimensional ISI Channels, Marrow et al., IEEE, Mar. 31-Apr. 4, 2003.*
Weeks IV, W., Full Surface Data Storage, PhD thesis, University of Illinois Urbana-Champaign, 2000, 131 pages.
Alini, R., "A 200-MSamplels Trellis-Coded PRML Read/Write Channel with Analog Adaptive Equalizer and Digital Servo," IEEE Journal of Solid-State Circuits, 32(11)1824-1838, Nov. 1997.

(Continued)

*Primary Examiner* — Ted M Wang
(74) *Attorney, Agent, or Firm* — Perkins Coie LLP

(57) ABSTRACT

A method and system for decoding data received from a channel experiencing two-dimensional inter-symbol interference, as well as systems implementing such a decoding method and system, are disclosed. The method includes an iterative multi-strip equalization method that receives a plurality of channel values associated with a plurality of locations in a plurality of rows of a matrix, computes initial probability values based upon those channel values, applies a BCJR algorithm to symbol probability values based upon bands of rows of the initial probability values, and resolves the results of applying the BCJR algorithm to arrive at a plurality of bands of rows of revised probability values, which are subsequently combined/substituted with one another. The process iteratively repeats until the revised probability values attain a sufficient degree of convergence. By utilizing data from overlapping bands to perform the BCJR algorithm, ISI in both dimensions is addressed.

27 Claims, 8 Drawing Sheets

OTHER PUBLICATIONS

Bertram, H.N., et al., "General analysis of noise in recorded transitions in thin film recording media," IEEE Transactions on Magnetics, 29(1):201-208, Jan. 1993.

Bertram, H.N. et al., "Analysis of DC noise in thin film media," IEEE Transactions on Magnetics, 40(4):2311-2313, Jul. 2004.

Bertram, H.N., Theory of Magnetic Recording, Chapter 11: Medium noise mechanisms: Part 2 -particulate noise, Cambridge University Press, pp. 283-305, (1994).

Burr, G.W., "Compensation for pixel misregistration in vol. holographic data storage," Optics Letters, 26 (8):542-544, Apr. 2001.

Etzion, T., et al., "Which Codes Have Cycle-Free Tanner Graphs?" IEEE Transactions on Information Theory, 45 (6):2173-2181, Sep. 1999.

Fredrickson, L., et al., "Trellis Coding in the Venus PRML Read/Write Channel," IEEE Transactions on Magnetics, 33(5):2743-2745, Sep. 1997.

Fu, C., et al., "Measurements and Analysis of Transition Noise in Perpendicular Media," IEEE Transactions on Magnetics, 39(5):2606-2608, Sep. 2003.

Gallager, R., "Low-Density Parity-Check Codes," IEEE Transactions on Information Theory, 8(1):21-28, Jan. 1962.

Gallager, R.G., Information Theory and Reliable Communication, Chapter 8: Waveform Channels, John Wiley and Sons, Inc., pp. 355-441, (1968).

Immink, A.H.J., et al., "Signal Processing and Coding for Two-Dimensional Storage," Proceedings of the IEEE Global Telecommunications Conference (Globecom'03), San Francisco, CA, USA, vol. 7, pp. 3904-3908, Dec. 2003.

Karabed, R., et al., "Matched Spectral-Null Codes for Partial-Response Channels," IEEE Transactions on Information Theory, 37(3):818-855, May 1991.

Karabed, R., et al., "Constrained Coding for Binary Channels with High Intersymbol Interference," IEEE Transactions on Information Theory, 45(6):1777-1797, Sep. 1999.

Kotter, R., et al., "Algebraic soft-decision decoding of Reed-Solomon codes," Proceedings of the IEEE International Symposium on Information Theory, Sorrento, Italy, Jun. 25th-30th, 2000, 1 page (abstract only).

Kotter, R., et al., "Algebraic Soft-Decision Decoding of Reed-Solomon Codes," IEEE Transactions on Information Theory, 49(11):2809-2825, Nov. 2003.

Krishnamurthi, S.A., Performance of Recursive Maximum Likelihood Turbo Decoding, Master of Science Thesis, College of Engineering and Technology of Ohio University, 121 pages, Aug. 2003.

Kurkoski, B.M., et al., "Joint Message-Passing Decoding of LDPC Codes and Partial-Response Channels," IEEE Transactions on Information Theory, 48(6):1410-1422, Jun. 2002.

Mackay, D.J.C., et al., "Near Shannon Limit Performance of Low Density Parity Check Codes," Electronics Letters, 32(18):1645-1646, Aug. 1996.

Marrow, M., et al., "Near Optimal Iterative Detection of the 2-Dimensional ISI Channel," IEEE Transactions on Communications, 18 pages, Feb. 2004.

Marrow, M., Detection and Modeling of 2-Dimensional Signals, Ph.D. Thesis, University of California, San Diego, 158 pages, (2004).

Marrow, M.N., et al., "A Fast Microtrack Simulator for High-Density Perpendicular Recording," IEEE Transactions on Magnetics, 40(4):3117-3119, Jul. 2004.

Mceliece, R.J. et al., "Turbo Decoding as an Instance of Pearl's "Belief Propagation" Algorithm," IEEE Journal on Selected Areas in Communications, 16(2):140-152, Feb. 1998.

Miller, J., et al., "High Code Rate Error Correction Code Design for Partial Response Systems," IEEE Transactions on Magnetics, 37(2):704-707, Mar. 2001.

Moon, J., et al., "Maximum transition run codes for data storage systems," IEEE Transactions on Magnetics, 32 (5):3992-3994, Sep. 1996.

Neifeld, M.A., et al., "Parallel data detection in p.-oriented optical memory," Optical Letters, 21(18):1481-1483, Sep. 1996.

Shannon, C.E., "A Mathematical Theory of Communication," the Bell System Technical Journal, vol. 27, pp. 379-423, 623-656, Jul., Oct. 1948.

Shokrollahi, A., "LDPC Codes: An Introduction," Digital Fountain, Inc., pp. 1-34, Apr. 2003.

Slutsky, B., et al., "Transition Noise Analysis of Thin Film Magnetic Recording Media," IEEE Transactions on Magnetics, 30(5):2808-2817, Sep. 1994.

Tang, D., et al., "Block Codes for a Class of Constrained Noiseless Channels," Information and Control, Academic Press, vol. 17, pp. 436-461, Oct. 1970.

Tanner, R.M., "A Recursive Approach to Low Complexity Codes," IEEE Transactions on Information Theory, IT-27 (5):533-547, Sep. 1981.

Taratorin, A.M., et al., "Correlation of DC Noise and Transition Noise in Magnetic Recording," IEEE Transaction on Magnetics, 40(1):129-136, Jan. 2004.

Valcu, B., et al., "Pulse Shape, Resolution, and Signal-To-Noise Ratio in Perpendicular Recording," IEEE Transaction on Magnetics, 38(1):288-294, Jan. 2002.

Weeks IV, W., "The Capacity and Coding Gain of Certain Checkerboard Codes," IEEE Transactions on Information Theory, 44(3):1193-1203, May 1998.

Wolf, J., "Efficient Maximum Likelihood Decoding of Linear Block Codes Using a Trellis," IEEE Transactions on Information Theory, IT-24(1):76-80, Jan. 1978.

* cited by examiner

METHOD AND SYSTEM FOR NEAR OPTIMAL ITERATIVE DETECTION OF THE 2-DIMENSIONAL ISI CHANNEL

CROSS-REFERENCE TO RELATED APPLICATIONS

This application is a continuation of U.S. patent application Ser. No. 11/001,956, filed Nov. 30, 2004 now U.S. Pat. No. 7,564,933.

STATEMENT REGARDING FEDERALLY SPONSORED RESEARCH OR DEVELOPMENT

Field of the Invention

The present invention relates to methods and systems for signal detection and processing, and more particularly relates to methods and systems for signal detection and processing of channels involving inter-symbol interference (ISI).

Background of the Invention

Efficient detection techniques for the one-dimensional inter-symbol interference (1-D ISI) problem, such as Viterbi equalization and decision-feedback equalization (DFE), have been well understood for almost thirty years and are in widespread use in communications devices. The complexity per bit of optimal detection procedures for finite-span 1-D ISI channels depends only on the duration of the channel response and is independent of the number of bits transmitted. However, for channels with more that one dimension, the complexity (per bit) of optimal detection becomes infinite as the extent of the multi-dimensional data set is allowed to become infinite, and there is no known optimal detection procedure with a constant per-bit complexity. This is true in particular with respect to two-dimensional inter-symbol interference (2-D ISI) channels.

The lack of an optimal detection procedure for 2-D ISI channels is problematic, since 2-D ISI channels are becoming of increasing interest in data storage and transmission. Current applications of low-complexity 2-D ISI detection techniques include high density page and volume oriented storage and digital imaging. 2-D ISI detection techniques also facilitate fast parallel readout of data from such memory devices. In the future, magnetic and optical recording channels, which have typically been modeled as 1-D, may require 2-D models to account for the interference from adjacent tracks as the recording density is increased. The lack of an optimal detection procedure for 2-D ISI thus poses a major obstacle for successful holographic and other data storage and imaging as well as signal processing.

The problem of detection of the 2-D ISI channel has been approached in several ways. For example, linear filtering has been employed to mitigate the effects of 2-D ISI. Also, attempts have been made to extend the applicability of 1-D ISI channel detection methods to the detection of 2-D ISI channels. In particular, multi-stage and iterative methods have been applied to the problem. For example, it has been suggested to apply the Viterbi Algorithm (VA) on each row of a multi-row two-dimensional image and subtracting out ISI from previously detected rows based on estimate(s) from earlier decisions, in effect, using the VA in one dimension and decision feedback (DF) in the other. Further for example, it has been suggested to apply threshold detection, and then to improve the detection estimate by an iterative post-processing procedure where bits are flipped if a lower distance estimate is obtained.

Despite these and other attempts to address the problem of detecting the 2-D ISI channel, none of these methodologies has proven to be satisfactory. For example, where linear filtering has been employed, noise enhancement has severely degraded performance, particularly with respect to channels having nulls. Further, the application of multi-stage and iterative methods to date have proven to be unsatisfactory. In particular, such methods have proven to be of limited value in terms of their level of performance and accuracy, and/or have proven to require excessive computation, or both. Consequently, present methods for detecting 2-D ISI channels are impractical.

Therefore, it would be advantageous if a new method and system could be developed to allow for detection of 2-D ISI channels. In particular, it would be advantageous if such new method and system could better approach theoretical limits of performance and at the same time be implemented without excessive computational requirements.

BRIEF SUMMARY OF THE INVENTION

The present inventor has developed, among other things, several improved methods for detecting the 2-D ISI channel that provide for more accurate detection than existing methods without the need for excessive computation. In contrast to existing methods of detecting signals on 2-D ISI channels, one such inventive iterative method utilizes information pertaining to both dimensions of 2-D ISI channels, based upon an assumption that the interference is of a local nature (and perhaps some Gaussian noise).

More particularly, in certain embodiments this inventive method operates by iteratively applying a BCJR (or other a-postiori probability) algorithm to a plurality of data sets that are based upon a plurality of overlapping groups or bands of rows of the channel data until a sufficient amount of convergence in the results occurs. By applying the BCJR in relation to data based upon overlapping bands of rows, the 2-D ISI problem effectively accounts for interference occurring along both of the two dimensions. The present invention is particularly helpful insofar as it rapidly approaches theoretical limits of performance in detecting the 2-D ISI channel without excessive amounts of computation.

More particularly, the present invention relates to a method of processing channel values received from a 2-D ISI channel to which was provided a plurality input values, the channel values being associated with a plurality of rows that together form a matrix. The method includes (a) computing a plurality of sets of combination values respectively based upon a plurality of overlapping subsets of the rows of channel values, (b) applying an a-postiori probability (app) algorithm to the plurality of sets of combination values, and (c) producing result values that are indicative of the input values that gave rise to the channel values, where the result values are produced based upon results from the application of the app algorithm.

Further, the present invention relates to a computer readable storage medium for use in detecting a 2-D ISI channel, where the storage medium includes computer executable code for instructing a computer to (a) compute a plurality of sets of combination values respectively based upon a plurality of overlapping subsets of rows of channel values received from the 2-D ISI channel, and (b) apply an app algorithm to the plurality of sets of combination values. Additionally, the computer executable code is for instructing the computer to (c) producing result values that are indicative of input values that gave rise to the channel values, where the result values are produced based upon results from the application of the app algorithm.

Further, the present invention relates to a 2-D memory storage and retrieval system. The system includes a 2-D memory storage device, and means for processing data received from the 2-D memory storage device. The means for processing the data is capable of removing at least some 2-D ISI from the data by performing at least one of a 2-D decision feedback equalization (DFE) procedure, a Turbo Product Equalization (TPE) procedure, a Turbo Decision-Feedback BCJR (DF-BCJR) Equalization procedure, a feed-forward multi-strip equalization procedure, and an iterative multi-strip equalization procedure.

Additionally, the present invention relates to a 2-D data communication system. The system includes a 2-D communication channel, and means for processing data received from the 2-D communication channel. The means for processing the data is capable of removing at least some 2-D ISI from the data by performing at least one of a 2-D decision feedback equalization (DFE) procedure, a Turbo Product Equalization (TPE) procedure, a Turbo Decision-Feedback BCJR (DF-BCJR) Equalization procedure, a feed-forward multi-strip equalization procedure, and an iterative multi-strip equalization procedure.

DETAILED DESCRIPTION OF THE PREFERRED EMBODIMENT

Figure 1:
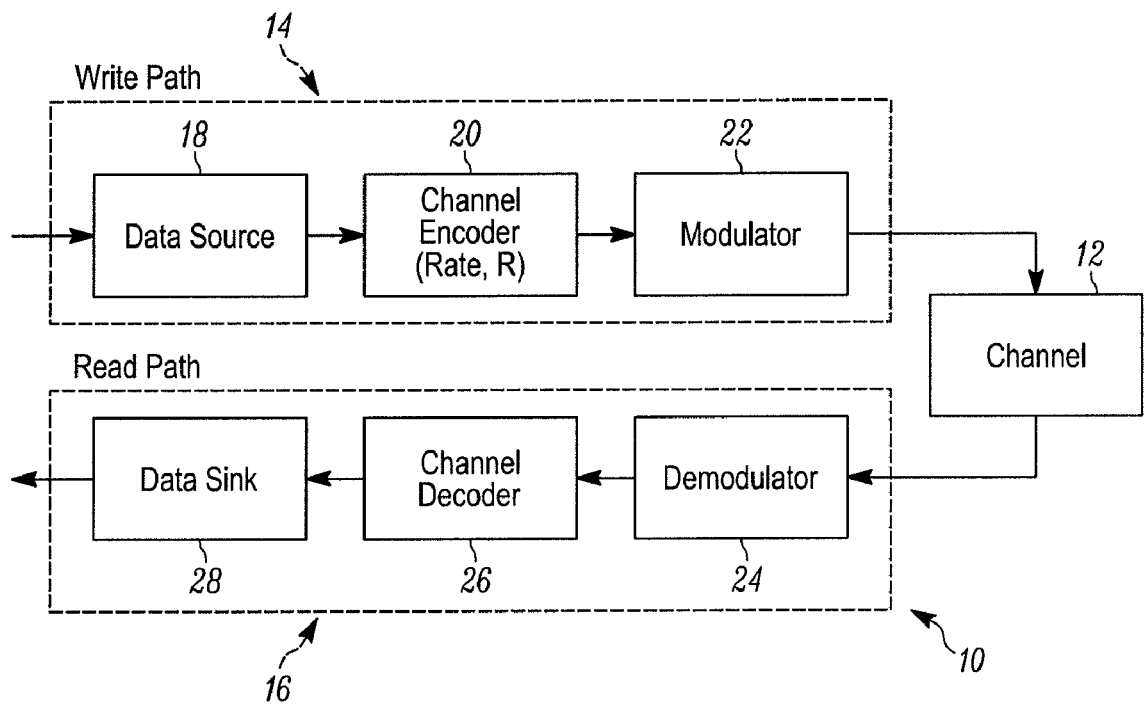
FIG. 1 is a block diagram showing signal flow among components of an exemplary data storage or communications system that can experience 2-D ISI.

FIG. 1 is a functional block diagram showing exemplary components of an exemplary data storage system 10 having a communications channel 12, by which information provided by way of a write path 14 is in turn communicated to a read path 16. The system 10, and the writing and reading performed by that system, are analogous to (and generally representative of) transmission and reception, respectively. That is, the data storage system 10 is representative not only of systems such as memory systems, in which data is stored in a medium represented by the channel 12, but also is representative of other communications channels as well, and the fact that the writing and reading operations may occur at different times is not relevant to the model.

A data source 18 of the data storage system 10 can be assumed to produce independent and identically distributed equally-likely binary digits. A channel encoder represented by a channel encoder block 20 introduces redundant information into the data stream to allow reliable communication through the channel 12 at higher storage densities than would otherwise be possible. The encoder block 20 can be further layered into error-control coding (ECC) and constrained coding (not shown), with a channel decoder block 26 modeling the inverse operations. A digital modulator 22 maps the coded binary digits into waveforms which the channel 12 is capable of transmitting. In saturated magnetic recording, for example, the magnetic medium contains grains which can be magnetized in either direction along their anisotropy axis and thus is well modeled by a binary input channel.

At desirable recording densities, the read head picks up the magnetic field from a number of neighboring bit cells, thus a useful channel model should have memory, such as the finite-state inter-symbol interference (ISI) channel. A demodulator 24 forms a sequence of numbers from the read-back waveforms, which the channel decoder 26 uses to estimate the written data. The demodulator output forms a set of sufficient statistics if it comprises a matched filter (not shown) followed by symbol rate sampler. The digital modulator 22, waveform channel 12 and digital demodulator 24 can be replaced by an equivalent discrete-time channel. In practice, an equalizer is commonly used to mitigate the ISI in the read-back samples and to allow the ECC decoder to operate as if its inputs were ISI free. This division of the decoding operation is sub-optimal, but the performance loss can be partially recovered by iterating between a soft-input soft-output (SISO) equalizer and an ECC decoder. Decoded data from the channel decoder 26 is in turn provided to a data receiving element shown as a data sink 28.

Figure 2:
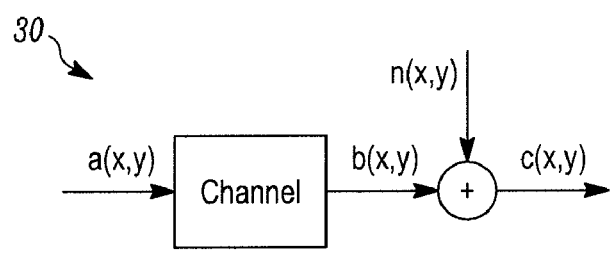
FIG. 2 is a signal flow diagram modeling an exemplary data storage or communication system that can experience 2-D ISI, as a discrete communications channel.

The data storage system 10 of FIG. 1 can be a page-oriented data storage system, which as shown in FIG. 2 can be modeled by a discrete communications channel 30, where the input and output signals are defined over the set of integer indices $(x,y)$, $x \in \{1, 2, \ldots, N\}$, $y \in \{1, 2, \ldots, M\}$. Assuming that this channel 30 is a two-dimensional, binary-input, linear finite-state, space-invariant, inter-symbol interference (2-D ISI) channel, it can be described by its 2-D impulse response h(x,y), where x and y are integer co-ordinates. The finite-state property of the channel 30 implies that its impulse response has a finite region of support. This region can be assumed to be a square region of size L×L (in order to maintain simple notation), with the understanding that any irregular-shaped region of finite size can be transformed into a square by choosing L sufficiently large and zero-padding. Further assuming that the outputs of the 2-D ISI channel are corrupted by additive white Gaussian noise (AWGN), the outputs of the 2-D ISI channel 30 can be described by the following equation:

$$c(x, y) = \sum_{p=0}^{L-1} \sum_{q=0}^{L-1} h(p, q) a(x - p, y - q) + n(x, y) \qquad (1)$$

In Equation (1), a(x,y) is the binary channel input, h(p,q) is the channel impulse response, n(x,y) is independent and identically distributed (i.i.d.) zero-mean Gaussian noise and c(x, y) is the noisy channel output. The input data a(x,y) is i.i.d., chosen equiprobably from the alphabet {−1,1} and assumed to be −1 outside the data range. The method described here is also applicable to channels with larger input alphabets, the required extension being evident to those having ordinary skill in the art. For an input data set of size N×N, this page termination incurs a rate loss of:

$$R_1 = \left(\frac{N}{N + L - 1}\right)^2 \qquad (2)$$

In keeping with the convention for 1-D channels, the variable v can be further used to denote the channel memory in each dimension which is related to the channel extent L by the relation v=L−1. As the procedures discussed herein primarily operate on rows and columns of an N×N matrix of user data a and an (N+v)×(N+v) matrix of noisy channel outputs c, it is convenient to define a notation to describe the $i^{th}$ row of a matrix a as $$\underline{a}_i = a(i; 1, \ldots, N), \qquad (3)$$

and a band of k adjacent rows from row i to row i+k−1 as $$a_i^{i+k-1} = a(i, \ldots, i+k-1; \ldots, N). \qquad (4)$$

In a similar manner, it is possible to define a single row of the noisy channel outputs, which are v elements longer than a user data row due to the page termination, as $$\underline{c}_i = c(i; 1, \ldots, N+v) \qquad (5)$$

and a band of such rows as $$c_i^{i+k} = c(i, \ldots, i+k; 1, \ldots, N+v). \qquad (6)$$

Columns rather than rows can be referenced by replacing the matrix with its transpose as follows:

$$(\underline{a'})_j = a(1, \ldots, N; j). \qquad (7)$$

Further, the individual elements of a row vector can be referred to with curly braces as $$\{a_i\}_j = \{(a')_j\}_i = a(i;j). \qquad (8)$$

In the present inventive detection procedure, probability distributions are dealt with that have over $2^n$ symbols corresponding to all binary vectors of length n, b=[$b_1, b_2, \ldots, b_n$], $\{\underline{b}\}_i = b_i$. In particular, the marginal distribution of a single bit of that vector is of interest, and to compute this the following notation can be employed. In particular, let $$F_{\underline{B}}(\underline{b}) = P[\underline{B} = \underline{b}]. \qquad (9)$$

Then (where □ denotes "is defined as")

$$M_i[\underline{b}] \square P[b_i = 1 \mid F_{\underline{B}}(\underline{b})] = \sum_{\underline{b}: \{b\}_i = 1} F_{\underline{B}}(\underline{b}) \qquad (10)$$

The various embodiments of detection procedures described herein are intended to be applicable to a wide variety of applications in which the two-dimensional ISI problem is encountered, ranging from a wide variety of memory applications, particularly those involving two-dimensional storage mechanisms (e.g., many magnetic storage media or optical storage media, or even holographic media), as well as other applications such as communications/data transmission applications. Indeed, insofar as the 2-D ISI channel can be shown to be basically identical to a sparse 1-D ISI channel, the present inventive detection procedure is equally applicable to such a sparse 1-D ISI channel as well. Further, the detection procedures can be applied to problems involving 2-D Markov random fields such as the 2-D phase unwrapping problem. The procedures can be performed by way of any of a variety of computers, microprocessors, or other processing devices that receive and process the raw data from the 2-D ISI channel (which are represented by, for example, the channel decoder 26 of FIG. 1). The operation of such computer or other processing devices in performing the detection procedures can be governed by way of software code stored in any of a variety of different types of memory devices of (or associated with) those processing devices, or alternatively such devices could be hard-wired to perform the detection procedures or controlled remotely (e.g., by way of the Internet) to do so.

Less-Preferred Two-Dimensional Detection Methods

It is known that application of decision feedback equalization (DFE) to the 1-D ISI problem avoids the noise enhancement associated with inverse linear filtering, an effect which becomes especially severe when the channel response contains nulls. In one dimension, DFE avoids the complexity of trellis based detection methods by making tentative preliminary (generally less-reliable) decisions and proceeding to decode assuming those decisions to be correct. It can also be viewed as a suboptimal reduced-complexity Viterbi Algorithm (VA) where only a single state is considered at each time interval.

Figure 3:
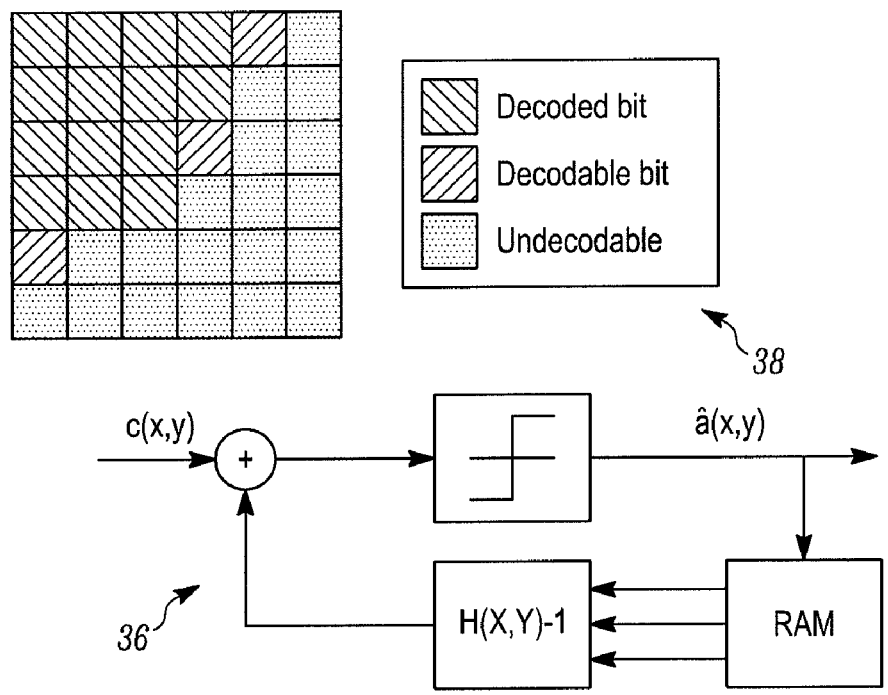
FIG. 3 is a signal flow diagram and related schematic showing implementation of a decision feedback equalization (DFE) procedure to the problem of decoding a 2-D ISI channel.

DFE can be applied to the 2-dimensional ISI channel problem, as shown by a signal flow diagram 36 and related schematic 38 in FIG. 3. In particular, the detection can be applied along any path, P={($x_1,y_1$),($x_2,y_2$), . . . } such that for any point in the path, both the point above and to the left are earlier in the path. Rastering the detection row-wise or column-wise meets this criterion and ensures that decisions have been made on all bits which influence a given channel observation except one. In particular as shown in the schematic 38, decisions are made on all bits above and to the left of the current bit, which are then used to subtract out their ISI contributions. However, because the energy in the tail of the response is subtracted out before the decision is made, the performance of DFE is strictly worse than maximum likelihood (ML) detection for non-trivial ISI.

Figure 4:
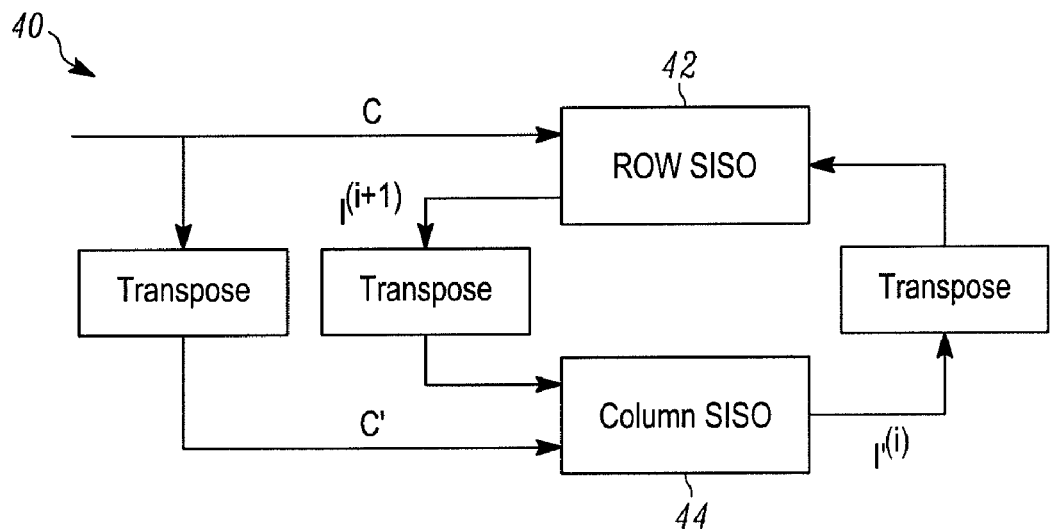
FIG. 4 is a signal flow diagram showing implementation of a Turbo Product Equalization (TPE) procedure to the problem of decoding a 2-D ISI channel.

A Turbo Product Equalization (TPE) procedure can also be applied with respect to the 2-D ISI Channel. In particular, referring to FIG. 4, a finite-complexity 2-D detection scheme modeled by a signal flow diagram 40 can be constructed using two finite-complexity soft-input soft-output (SISO) detectors, where a first of the SISO detectors 42 operates on rows and a second of the SISO detectors 44 operates on columns. As these constituent detectors treat ISI from the other dimension as noise, in isolation they will perform poorly, especially for channels with a large amount of ISI. Message passing can be employed in an attempt to improve the performance. One such scheme is to use two 1-D Bahl, Cocke, Jelinek, Raviv (BCJR) a posteriori probability (APP) algorithms, each matched to the ISI in one dimension, treating the ISI in the other dimension as noise. As shown in FIG. 4, such an iterative equalizer procedure is applied to each row/column, treating ISI from adjacent rows/columns as noise. The soft-input, soft-output blocks operate on the entire data grid, but treat rows/columns independently. The resulting iterative equalizer resembles a turbo-decoder with the important exception that the same channel values are fed to both constituent detectors, introducing cycles in the underlying decoding graph.

Detection using this procedure begins by applying the BCJR algorithm independently to each row to form the array of log-APP ratios, using the following equation:

$$1^{(1)}(x; y) = \log \frac{P[a(x; y) = 1 \mid \underline{c}_x]}{P[a(x; y) = -1 \mid \underline{c}_x]}. \quad (11)$$

On the second pass, the BCJR algorithm is applied independently to each column, taking the extrinsic information from the first pass, $1^{(1)}$, into account as if it were obtained from independent observations as in a typical turbo decoder and subtracting it out, by way of the following:

$$1^{(2)}(x; y) = \log \frac{P[a(x; y) = 1 \mid (\underline{c'})_y, (1^{(1)'})_y]}{P[a(x; y) = -1 \mid (\underline{c'})_y, 1^{(1)'})_y]} - 1^{(1)}(x; y). \quad (12)$$

On the third pass, detection proceeds row-wise again, using both the channel observations c and extrinsic information from the second pass, $1^{(2)}$, yielding log-APP ratios, by way of the following equation:

$$1^{(3)}(x; y) = \log \frac{P[a(x; y) = 1 \mid \underline{c}_x, 1_x^{(2)}]}{P[a(x; y) = -1 \mid \underline{c}_x, 1_x^{(2)}]} - 1^{(2)}(x; y). \quad (13)$$

This iterative process is continued for a fixed number of iterations or until some stopping criterion is met. Although this iterative process can achieve a result, it often performs poorly, and is inferior to the less complex above-discussed DFE detector. In treating the unaccounted-for ISI (UA-ISI) from adjacent strips as noise, the performance of the constituent detectors is relatively poor, with the UA-ISI contribution to the noise power exceeding that of the Gaussian noise component for all but low signal-to-noise ratios (SNRs). For the case of the 1$^{st}$ order channel, h, with 3 non-zero coefficients, is as follows:

$$h = \begin{bmatrix} 1 & \alpha \\ \alpha & 0 \end{bmatrix} \quad (14)$$

and the noisy channel outputs are $$c(x; y) = \underbrace{a(x; y)}_{\text{signal}} + \underbrace{\alpha a(x; y - 1) + \alpha a(x - 1; y)}_{\text{UA-ISI}} + \underbrace{n(x; y)}_{\text{AWGN}}. \quad (15)$$

$$\underbrace{\hspace{4cm}}_{\text{noise}, n_t(x; y)}$$

Further, the constituent detector is the BCJR algorithm matched to a trellis generated by the 1-D ISI channel $h_1(D)=1+\alpha D$. Although the total noise (UA-ISI+Gaussian) $n_t(x;y)$ is non-Gaussian, it is i.i.d. and the optimal branch metrics for a single pass of the procedure (implemented in the log domain) are in accordance with the following equation $$b_k(x; y) = \frac{-(c(x; y) - \overline{c}_k)^2}{2\sigma^2} + \log\left(\sinh\frac{\alpha(c(x; y) - \overline{c}_k)}{\sigma^2}\right) + l_k(x; y) \quad (16)$$

where $c_k$ is the expected value of the observation given the inputs associated with the kth branch, $\sigma^2$ is the Gaussian noise variance and $l_k(x;y)$ is the extrinsic information from the previous iteration applied to the kth branch. When the BCJR algorithm is used in an iterative scheme, it is not clear that the above branch metric is optimal, and simulations suggest that the simplest metric obtained by treating the total noise as Gaussian gives similar performance.

Figure 5:
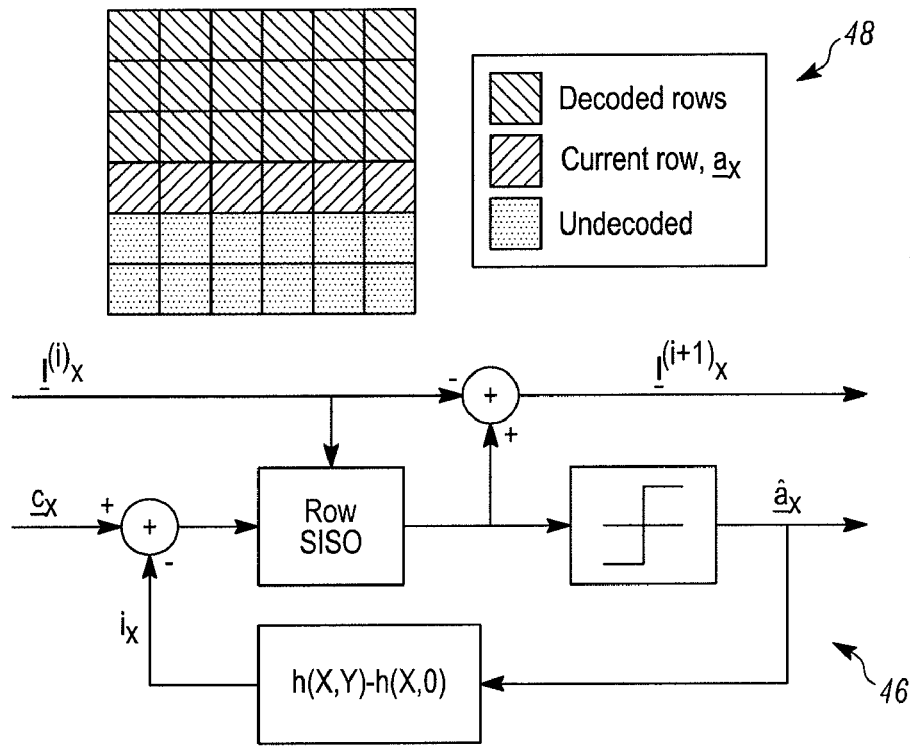
FIG. 5 is a signal flow diagram and related schematic showing implementation of a Turbo Decision-Feedback BCJR (DF-BCJR) equalization procedure to the problem of decoding a 2-D ISI channel.

A further procedure that can be employed is Turbo Decision-Feedback BCJR (DF-BCJR) Equalization. The performance of the constituent detectors can be improved by either reducing the UA-ISI term or by treating it as a signal component. The former can be achieved by pre-processing the channel output with a linear or non-linear equalizer in a direction orthogonal to the strips being processed by the BCJR algorithm. Linear equalization would reduce the UA-ISI term at the expense of enhancing the Gaussian noise component and introducing correlations which could affect the convergence of the message-passing scheme. To avoid the noise enhancement, decision feedback (DF) can be used in one dimension and the BCJR algorithm in the other dimension as shown by a signal flow diagram 46 in FIG. 5 (a related schematic 48 in that figure also illustrates processing of strips in accordance with this procedure).

To improve the performance of each pass of the constituent detectors and thus of the overall iterative system, the DF-BCJR procedure can be further modified to allow passing of soft-information from strip to strip. Avoiding decision feedback, which results in the ISI tail energy being discarded, requires a trellis expansion, with each state being split so that information about the adjacent bit(s) from the previous strip(s) can be included in the branch metrics. This can be viewed as decoding multiple strips at a time and overlapping the multiple strips so that soft information can be propagated and the entire response energy utilized. For the case of a 2-D channel with response support region of size 2×2, this corresponds to decoding 2-bit wide strips using a 4 state trellis with quaternary input symbols.

Figure 6:
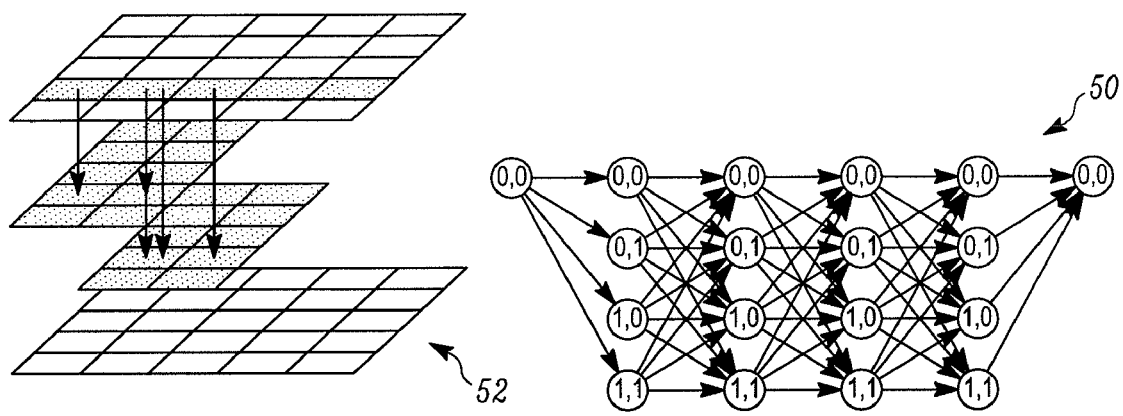
FIG. 6 illustrates, in a schematic form, aspects of the application of a feed-forward multi-strip equalization procedure to the problem of decoding a 2-D ISI channel.

Referring to FIG. 6, this "feed-forward multi-strip equalization" decoding procedure proceeds by decoding pairs of overlapping rows with a quaternary BCJR trellis detector as represented by a trellis diagram 50, with the marginal bit probabilities passed sequentially from left to right. That is, as shown in diagram 52 of FIG. 6, the procedure proceeds from the leftmost 2 columns toward the right, shifting by one column after each pass of the quaternary BCJR algorithm. Information is propagated by marginalizing out the extrinsic information about the right column of bits from the quaternary symbols which then become the input information about the left column of bits on the next application of the BCJR algorithm. Again, as the procedure is soft-input soft-output (SISO), it can be used iteratively, noting that the decoding graph suggests using total (intrinsic) information from the last column, but extrinsic information from the last row pass. The trellis branch metric is thus in accordance with the following equation:

$$b_k(x; y) = \frac{-(c(x; y) - \overline{c}_k)^2}{2\sigma^2} + (l_k^{(j-1)}(x; y) - l_k^{(j-2)}(x; y)) + \\ (l_k^{(j-1)}(x-1; y) - l_k^{(j-2)}(x-1; y)) + l_k^{(j)}(x-1; y). \quad (17)$$

It has been found empirically that superior performance can be achieved by alternating between row-wise and column-wise detection (as with the TPE procedure) rather than repeated application along the same dimension.

Preferred Two-Dimensional Detection Method

Figure 7:
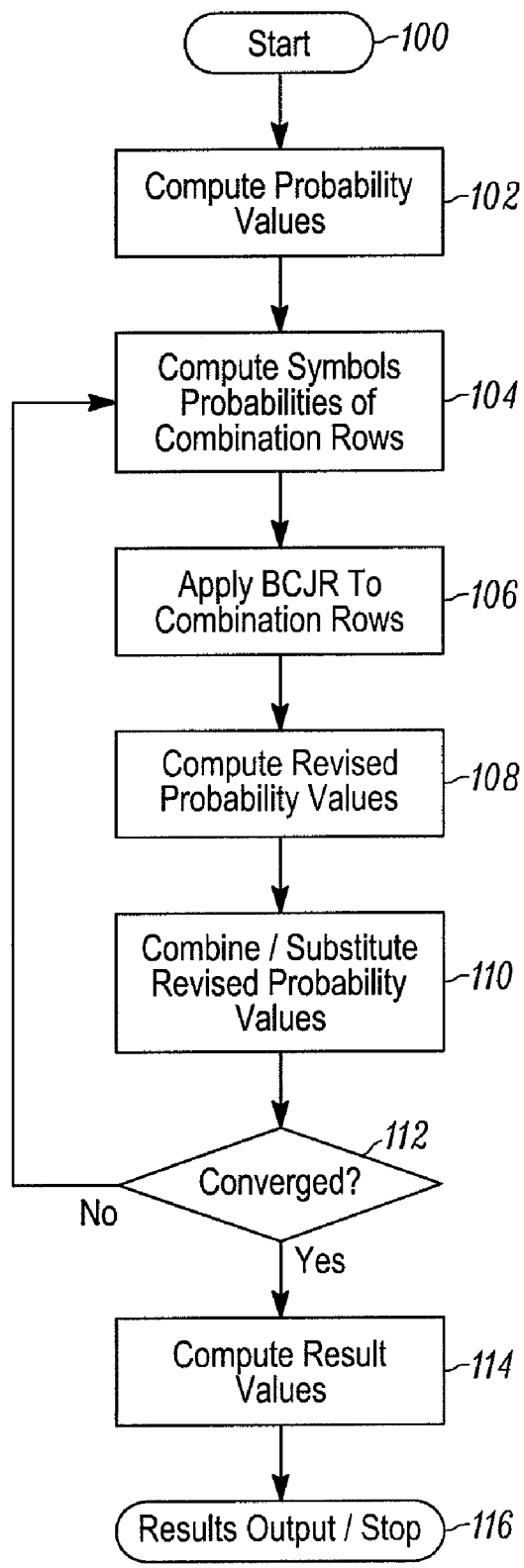
FIG. 7 is a flow chart showing generalized steps of a preferred, iterative multi-strip equalization (IMS) procedure that can be utilized to perform decoding of a 2-D ISI channel, in accordance with at least some preferred embodiments of the present invention.

The information being passed forward between overlapping bands in the feedforward multi-strip equalization procedure is in essence enforcing a constraint that overlapping bands contain v−1 rows of common bits. A graphical representation of this constraint is to connect the overlapping bands with edges passing through "bit" nodes. Here the "bit" nodes obey the same rule as the "bit" nodes in a Tanner graph representation of a low-density parity-check (LDPC) code. Assuming this to be the case, a new "iterative multi-strip equalization" (IMS) procedure for detecting the 2-D ISI channel can be developed. Referring to FIG. 7, a flow chart shows generalized steps of this improved procedure for two-dimensional ISI channel detection. Additionally, referring to FIGS. 8-11, performance of these steps in relation to an exemplary 5×5 2-D ISI channel is shown in a figurative manner, which includes a display of the aforementioned "bit" nodes. In actual 2-D applications, the data sets are typically much larger than 5×5.

Figures 8, 9:
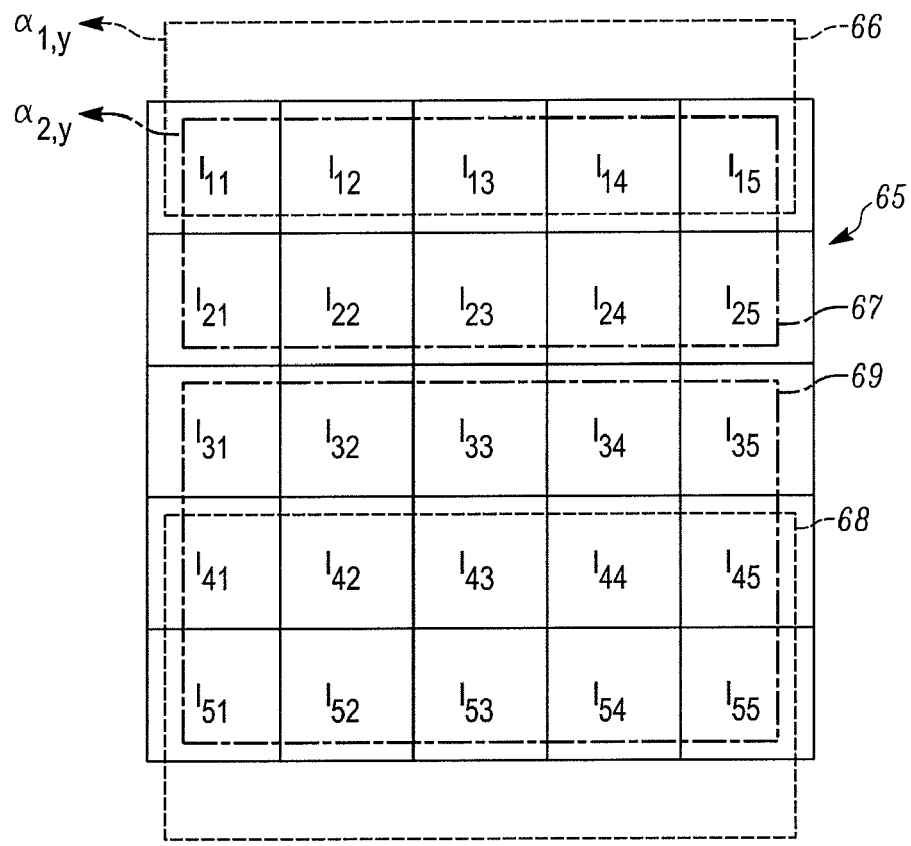
FIG. 8 shows an exemplary 5×5 2-D matrix of channel values that can be received from a 2-D channel experiencing 2-D ISI, which in turn can be decoded/processed using the IMS procedure of FIG. 7.
FIG. 9 shows an exemplary 5×5 2-D matrix of probability values that have been obtained based upon the matrix of channel values of FIG. 8, and further shows how those probability values can be grouped into overlapping bands of rows to form combination rows.

Detection of the 2-D ISI channel in accordance with the IMS procedure proceeds as follows. As shown in FIG. 7, after commencing operation at a step 100, at a step 102 the values received from the channel, $c_{x,y}$, which need not be binary values of 0 or 1, are converted into probability values. That is, each value from the channel is converted into a probability value that is indicative of a probability that the given channel value was a particular value when it was originally input to the channel given that received channel and the channel noise statistics (e.g., if the channel value from the channel is a 0.8, the corresponding probability value might be 0.75 indicating that there is a 75% chance that the original data value that was input to the channel was a 1 rather than a 0). Thus, for an exemplary 5×5 2-D ISI channel having the channel values $c_{1,1}$ through $c_{5,5}$ shown as a 5×5 matrix 60 in FIG. 8, a probability value is calculated for each of those channel values to arrive at a similar 5×5 matrix 65 of probability values $l_{1,1}$ through $l_{5,5}$, which is shown in FIG. 9.

In some embodiments, the probability values $l_{x,y}$ are calculated from values received from the channel $c_{x,y}$ as log-likelihood ratios (LLRs). The log-likelihood ratio values can be calculated for the case of an additive white Gaussian noise (AWGN) channel by way of the following equation:

$$l(x; y) = \log\frac{P[a(x; y) = 1 \mid c(x; y)]}{P[a(x; y) = -1 \mid c(x; y)]} \quad (18)$$
$$= 4\frac{E_s}{N_0}c(x; y).$$

If the channel has correlated noise, a 2-D whitening pre-filter (not shown) can be applied to produce a similar AWGN channel. Although log-likelihood (or log-probability) ratios can be employed due to their simplicity, the present IMS procedure can alternatively be designed using any of probabilities, probability ratios, log-probabilities or other appropriate relationships.

Next, at a step 104 as shown in FIG. 7, symbol message probabilities (or simply "symbol probabilities") $\alpha_{x,y}$ are calculated. At this step, the trellis detector works with the larger alphabet A, and the bit messages are combined to form the symbol probabilities according to the constituent bits in each symbol. Each set of symbol probabilities $\alpha_{x,y}$ is created from a given band or set of rows of probability values to form effectively a "combination row" of symbol probabilities. Further, in accordance with the present method, sets of symbol probabilities are created for overlapping bands of rows. The number of rows that are banded together, and thus the number of values that are combined to form any given symbol probability, in any given embodiment/circumstance depends upon the presumed extent of the 2-D ISI channel of interest.

For example, as illustrated by FIG. 9, if it is presumed that the channel has an extent of two, then it is presumed that input values to the channel only influence the values received from the channel that are directly neighboring those input values (e.g., $a_{1,1}$ influences $c_{2,1}$ but not $c_{3,1}$). Consequently, combination rows of symbol probabilities $\alpha_{x,y}$ are formed from pairs of rows of probability values, such as pairs of rows 66 and 67 in FIG. 9. Further as exemplified by the pairs of rows 66 and 67, combination rows of symbol probabilities are formed with respect to all pairs of rows that overlap (e.g., symbol probabilities $\alpha_{1,y}$ and $\alpha_{2,y}$). The combination rows that are formed include two combination rows that are formed from the probability values of the top and bottom rows of the matrix 65 as well as from assumed/imagined zero values representing additional imaginary rows above and below those top rows of the matrix, respectively (e.g., as shown by the pair of rows 66. Thus, for the 5×5 matrix 65 of FIG. 9, six combination rows of symbol probabilities $\alpha_{x,y}$ would be calculated. The grid termination can be implemented by pruning the BCJR trellis or by constraining the a-priori probabilities in the BCJR procedure when it is applied to rows which include termination bits.

Alternately, also as illustrated by FIG. 9, if it is presumed that the channel has an extent of three, then it is presumed that input values to the channel only influence values received from the channel if those values are within two rows of one another. Consequently, in that case, combination rows of symbol probabilities $\alpha_{x,y}$ are formed from triplets of rows of probability values, such as triplets of rows 68 and 69 in FIG. 9. As in the previous example, in all, six combination rows formed from six overlapping bands of triplets of rows would be generated for the 5×5 matrix 65 of FIG. 9 (including two combination rows formed from triplets of rows using presumed zero values of imaginary rows along the top and bottom of the matrix, such as the triplet of rows 69). Further, if alternatively the channel is presumed to be of a greater extent (such as, for example, an extent of four or more), then combination rows of symbol probabilities based upon groups of more rows are computed and considered.

In general, the symbol probabilities $\alpha_{x,y}$ are computed as follows. The contribution of the bit message from the jth edge $q_j^{(1)}(x;y)$ to the distributions $\underline{s}_j^{(1)}(x;y)$ is:

$$\underline{s}_j^{(1)}(x;y) = P[a(x-v, \ldots, x-1, x; y) = \alpha \mid q_j^{(1)}(x;y)] \quad (19)$$

$$= \begin{cases} q_j^{(1)}(x;y), & \{\alpha\}_j = 1 \\ 1 - q_j^{(1)}(x;y), & \{\alpha\}_j = 0. \end{cases}$$

The messages are then combined by assuming they are independent, in accordance with the following:

$$\underline{s}^{(1)}(x;y) = \prod_{j=1}^{v+1} \underline{s}_j^{(1)}(x;y). \quad (20)$$

For example, assuming a 2-D ISI channel of extent two, and assuming the 5×5 matrix 65 of probability values $l_{1,1}$ to $l_{5,5}$ of FIG. 9, symbol probabilities $\alpha_{x,y}$ would be calculated to allow for the creation of 6 combination rows based upon 6 pairs of rows. Each individual symbol probability of each combination row would be created by combining two adjacent probability values of different rows within its corresponding pair of rows. For example, in forming a combination row of symbol probabilities corresponding to the pair of rows 67 shown in FIG. 9, five symbol probabilities would be created by combining $l_{1,1}$ with $l_{2,1}$, $l_{1,2}$ with $l_{2,2}$, $l_{1,3}$ with $l_{2,3}$, $l_{1,4}$ with $l_{2,4}$ and $l_{1,5}$ with $l_{2,5}$. Each of these five symbol probabilities would take into account four different probabilities associated with four different possible meanings of its probability values. That is, for example, the symbol probability based upon the probability values $l_{1,1}$ with $l_{2,1}$ would represent the four probabilities that the true input values to the channel $a_{1,1}$ and $a_{2,2}$ corresponding to $l_{1,1}$ with $l_{2,1}$ were in fact 0 and 0, 0 and 1, 1 and 0, and 1 and 1, respectively. These four probabilities could be calculated in a multiplicative manner, e.g., by multiplying $l_{1,1}$ by $l_{2,1}$. If the calculation is performed in the log-domain (e.g., using log-probabilities or log-likelihood ratios), then the multiplication becomes an addition (log A*B=logA+logB).

Similarly, assuming a 2-D ISI channel of extent three, and assuming the 5×5 matrix 65 of probability values $l_{1,1}$ to $l_{5,5}$ of FIG. 9, symbol probabilities $\alpha_{x,y}$ would be calculated to allow for the creation of 6 combination rows based upon 6 triplets of rows. Each individual symbol probability of each combination row would be created by combining three adjacent probability values of different rows within its corresponding triplet of rows. For example, in forming a combination row of symbol probabilities corresponding to the triplet of rows 69 shown in FIG. 9, five symbol probabilities would be created by combining $l_{3,1}$ with $l_{4,1}$ and $l_{5,1}$, $l_{3,2}$ with $l_{4,2}$ and $l_{5,2}$, $l_{3,3}$ with $l_{4,3}$ and $l_{5,3}$, $l_{3,4}$ with $l_{4,4}$ and $l_{5,4}$, and $l_{3,5}$ with $l_{4,5}$ and $l_{5,5}$. Each of these five symbol probabilities would take into account eight different probabilities associated with eight different possible meanings of its probability values. Although the above describes one manner of calculating symbol probabilities from their component probability values, alternate manners of calculating symbol probabilities can also be employed.

Once the symbol probabilities for the combination rows have been calculated, the BCJR algorithm is then applied to every combination row of symbol probabilities $\alpha_{x,y}$ at a step 106. That is, the BCJR algorithm is applied to every band of v+1 adjacent rows corresponding to user data bits $a_{x-v}^x$, but using only a single row of received values $\underline{c}_x$ with each application of the algorithm ($\underline{c}_{x+1}$, etc. also contains information about the data bits and could have been used in the algorithm, but are unnecessary due to the combining of the outputs later). For x<v+1 or x>N, the band $a_{x-v}^x$ contains known termination bits which are accounted for by either trellis pruning or inclusion of this a priori information in the branch metrics. Using more than one row of noisy channel outputs would introduce additional loops/iterations into the operation of the IMS procedure. Furthermore, each branch in the trellis is associated with every data bit involved in the computation of the received value, thus the branch metric is a squared distance term and there is no need to average over other interfering terms.

Since the BCJR algorithm is being used with strips of width v+1 bits, the input symbol probabilities $\alpha$ are over the alphabet $A=\{0, \ldots, 2^{v+1}-1\}$. The result of applying the BCJR algorithm is the set of N(N+v) probability distributions $\underline{r}^{(1)}(x;y)$, $x \in Z_1^{N+v}$, $y \in Z_1^N$:

$$\underline{r}^{(1)}(x;y) = P[a(x-v, \ldots, x-1,x;y) | \underline{c}_x]. \quad (21)$$

Each probability distribution $\underline{r}^{(1)}(x,y)$ is over the v+1-bit symbol as follows:

$$[a(x-v;y), a(x-v+1;y), \ldots, a(x;y)]. \quad (22)$$

Also, each data bit $a(x,y)$ is involved in the v+1 distributions as follows:

$$\{\underline{r}^{(1)}(x;y), \underline{r}^{(1)}(x+1;y), \ldots, \underline{r}^{(1)}(x+v;y)\} \quad (23)$$

being bit $\{0, \ldots, v\}$ respectively of the underlying symbols. For a 2-D ISI channel of extent two, this relationship can be seen graphically as a trellis portion 105 of a message passing graph shown in FIG. 10.

Turning to a step 108 of FIG. 7, revised probability values corresponding to the overlapping sets of rows are then computed based upon the results of applying the BCJR algorithm. That is, the results of applying the BCJR algorithm to each given combination row are resolved back into probability values corresponding to the individual rows of each set of overlapping rows. The manner in which these revised probability values are computed can vary depending upon the embodiment. One exemplary manner would be to compute the marginal probability of each bit as described in equation 10.

Figure 10:
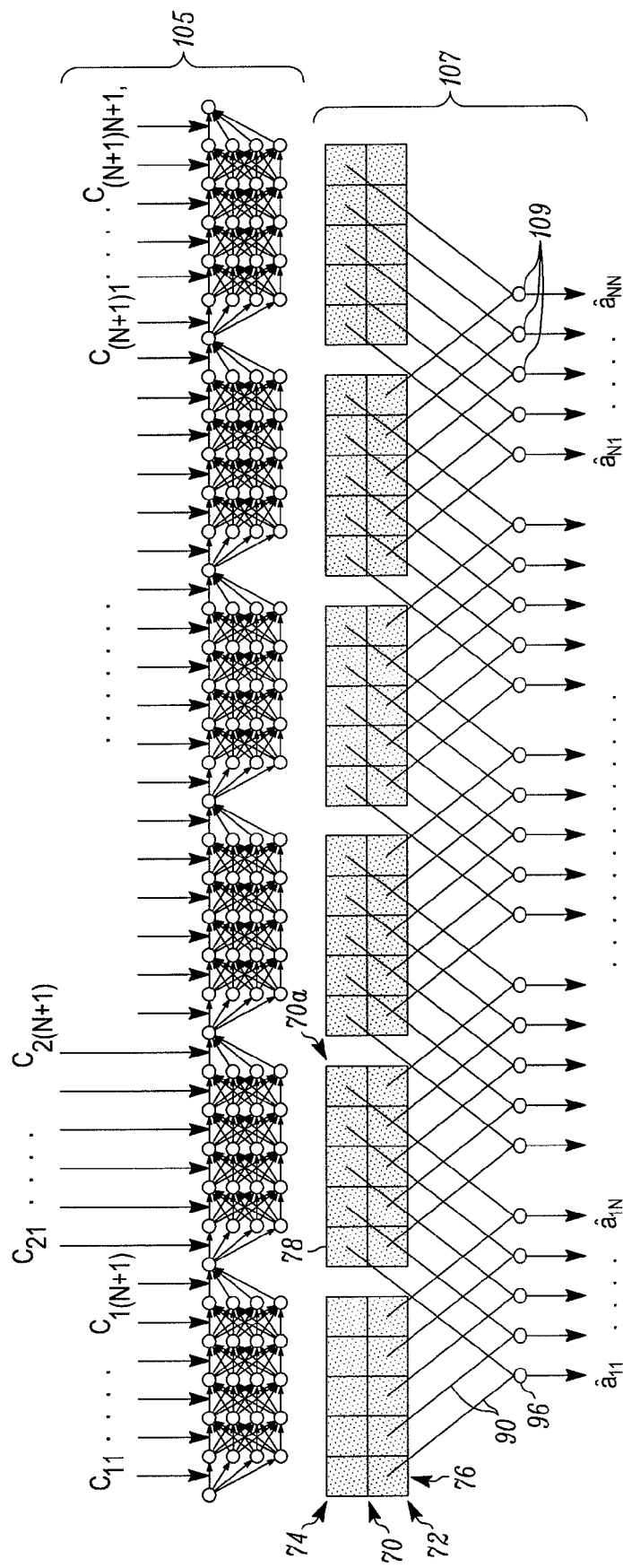
FIG. 10 is a graph showing exemplary message passing (e.g., a Tanner graph) and bit combining that would occur during application of the IMS procedure of FIG. 7 when applied to the 5×5 2-D matrix of probability values of FIG. 9, assuming a 2-D ISI channel of extent two.

For example, assuming a 2-D ISI channel of extent two and the 5×5 matrix 65 of probability values of FIG. 9, one would utilize the probability values $l_{1,1}$ through $l_{2,5}$ associated with the pair of rows 67 to generate a combination row of symbol probabilities $\alpha_{2,y}$. After applying the BCJR algorithm to those symbol probabilities of the combination row at step 106, five BCJR output values, corresponding to the a-posteriori probability distributions of the 5 quaternary symbols would result. Subsequently, in step 108, these five BCJR output distributions over five bit-pairs would in turn be resolved into ten revised bit probability values of a new pair of rows 70a as shown in FIG. 10. Further, insofar as (as discussed above), the pair of rows 67 was only one of six pairs of rows of probability values arising from the 5×5 matrix 65, the result of step 108 would be the creation of six pairs of rows 70 shown in FIG. 10. Similarly, as shown in FIG. 11, assuming a 2-D ISI channel of extent three and the 5×5 matrix 65 of probability values of FIG. 9, the results of step 108 would be the generation of six triplets of rows 80 of revised probability values.

Because the combination rows of symbol probabilities (upon which the BCJR algorithm is applied) "overlap" one another, the revised probability values calculated based upon the BCJR output values also overlap one another. That is, step 108 results in multiple revised probability values corresponding to each original probability value $l_{x,y}$. For example, in the case of the 2-D ISI channel of extent two and the 5×5 matrix 65, the performing of step 108 results in six pairs of rows 70. As shown in FIG. 10, each of the lower rows 72 and upper rows 74 of the pairs of rows 70 includes 5 revised probability values. Further, the respective revised probability values of each of the lower rows 72 respectively correspond to the same original probability values $l_{x,y}$ as the respective revised probability values of each of the upper rows 74, with the exception of the upper row of the leftmost pair of rows and the lower row of the rightmost pair of rows (which correspond to the assumed zero values for the "imaginary" rows above and below the top and bottom rows of the matrix 65). Thus, for example, both a lower, leftmost one 76 of the revised probability values of the leftmost pair of rows 70 as well as an upper, leftmost one 78 of the revised probability values of the second pair of rows 70a would correspond to the original probability value $l_{1,1}$.

Figure 11:
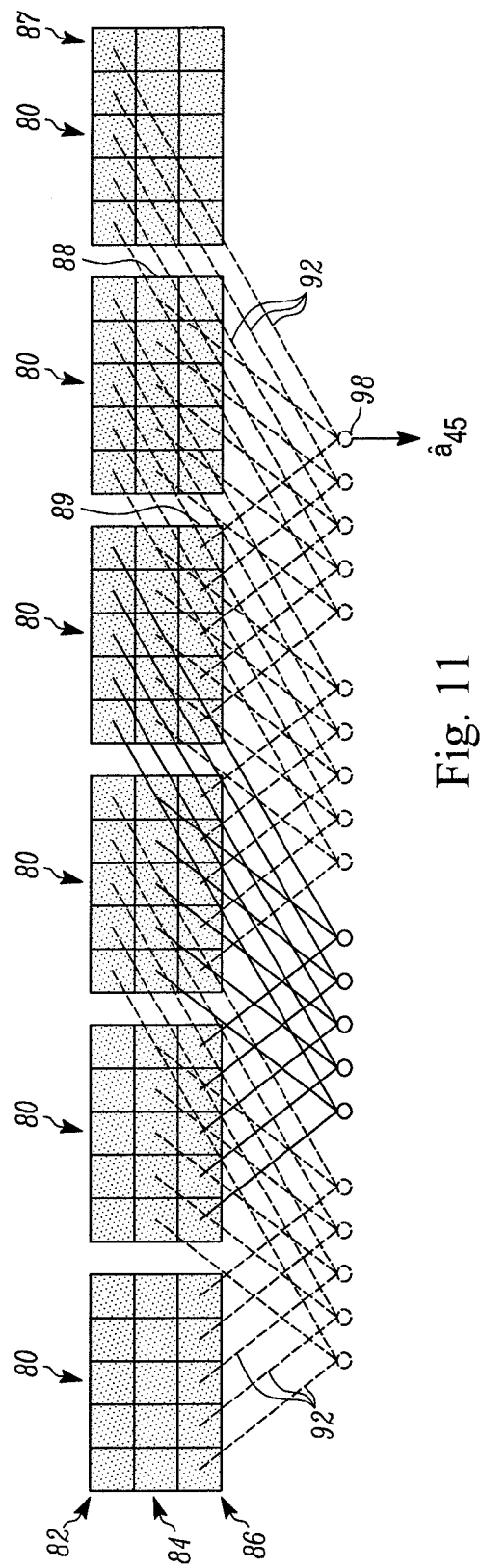
FIG. 11 shows exemplary message passing/bit combining that would occur during application of the IMS procedure of FIG. 7 when applied to the 5×5 2-D matrix of probability values of FIG. 9, assuming a 2-D ISI channel of extent three.

Similarly, in the case of the 2-D ISI channel of extent three and the 5×5 matrix 65, the performing of step 108 results in six triplets of rows 80 as shown in FIG. 11. Each of the upper rows 82, middle rows 84 and lower rows 86 includes 5 revised probability values. Further, the respective revised probability values of each of the lower rows 86 respectively correspond to the same original probability values $l_{x,y}$ as the respective revised probability values of the middle row 84 of the neighboring triplet of rows to the right, as well as the respective revised probability values of the upper row 82 of the subsequent neighboring triplet of rows to the right (again with the exception of the upper row of the leftmost pair of rows and the lower row of the rightmost pair of rows). Thus, for example, each of an upper, rightmost one 87 of the revised probability values of the rightmost triplet of rows 80, a middle, rightmost one 88 of the revised probability values of the neighboring triplet of rows (neighboring the rightmost triplet to its left), and a lower, rightmost one 89 of the revised probability values of the next successive triplet of rows to the left would correspond to the original probability value $l_{4,5}$.

It is this overlapping of the combination rows, and resulting overlapping of revised probability values after step 108, that allows data from the multiple rows of the received channel values $c_{x,y}$ to be "shared" so that the output of the IMS procedure more accurately reflects the original data values $a_{x,y}$ provided to the channel. This sharing occurs at a step 110, in which the overlapping revised probability values are combined/substituted with one another, as illustrated in a portion 107 of FIG. 10 and in FIG. 11 by connection lines 90 and 92, respectively. The connection lines 90,92 indicate that the combination/substitution operation involves message passing that proceeds in typical belief propagation fashion, in which the message propagated along an edge exiting a node is formed by combining the incoming messages excluding that one edge. The v+1 messages $\{p_i^{(1)}(x;y)\}_{i=0}^{v}$ to be passed to each bit node (x;y) are the marginal distributions for that bit computed from the BCJR output distributions in accordance with the following equation:

$$p_i^{(1)}(x;y) = M_{v-i+1}[\underline{r}^{(1)}(x+i;y)]. \quad (24)$$

As with the Tanner graph of an LDPC code, every incident edge into a bit node is associated with the same bit, thus the bit node to trellis node messages $\{q_j^{(1)}(x;y)\}_{j=0}^{v}$ are:

$$q_j^{(1)}(x;y) = \prod_{i:\ i \neq j} p_i^{(1)}(x;y). \quad (25)$$

Thus, as shown in FIG. 10, in the case where the 2-D ISI channel is of an extent two, the combination/substitution operation reduces to a reordering of the revised probability values, where the outgoing message on each edge from the bit nodes are reordered according to the bit node to trellis node connections represented by the connection lines 90. More particularly, for example, the revised probability value 76 is substituted for the revised probability value 78, and vice-versa. However, as shown in FIG. 11, in the case where the 2-D ISI channel is of an extent three, the combination/substitution operation involves substituting each revised probability value with the normalized product of the other two revised probability values that correspond to the same channel input bit. Thus, for example, revised probability value 87 would be replaced by the product of revised probability values 88 and 89, revised probability value 88 would be replaced by the product of revised probability values 87 and 89, and revised probability value 89 would be replaced by the product of revised probability values 87 and 88. Each of the products should be normalized so that it represents a distribution (i.e. the sum of the probability that the bit is a 1 and the probability that the bit is a 0 should equal 1). If the calculation is performed in the log-domain (e.g. using log-probabilities or log-likelihood ratios), then the product becomes a sum.

Next, at a step 112, it is determined whether the revised probability values (after being combined/substituted at step 110) have sufficiently converged, e.g., whether the various revised probability values corresponding to the same original channel value/original probability value are sufficiently close to one another. For example, in the case of the 2-D ISI channel of extent two shown in FIG. 10, it is determined whether the revised probability values 76 and 78 are sufficiently close to one another, as well as whether the other pairs of the revised probability values corresponding to the same respective original probability values are sufficiently close to one another. Also for example, in the case of the 2-D ISI channel of extent three shown in FIG. 11, it is determined whether the revised probability values 87, 88 and 89 are sufficiently close to one another, as well as whether the other sets of three revised probability values corresponding to the same respective original probability values are sufficiently close to one another.

Although a variety of convergence criteria are possible, one exemplary convergence criterion (or proxy for such a criterion) is to check if the sign of any of the bit messages have changed since the last iteration. If none have changed, then the hard decisions on the bits will be unchanged, thus indicating that the procedure has reached a stable point. If the convergence criterion is not met, the IMS procedure returns to step 104 and conducts additional iterations (it can be preferable to run the procedure for a fixed number of iterations). Assuming that a second iteration is required after the first iteration (this is usually the case), the BCJR algorithm in subsequent iterations (e.g., at step 106) utilizes both channel observations and extrinsic information from each of the bits nodes, according to the following relation:

$$\underline{r}^2(x;y) = P[a(x-v,\ldots,x-1;x;y)|c_x s^{(1)}(x;y)]. \quad (26)$$

The message passed to a bit node along edge i are computed excluding the message received from that node on the previous iteration, according to the following relation:

$$p_i^2(x;y) = M_{v-i+1}[\underline{r}^{(2)}(x+i;y)/\underline{s}_i^{(1)}(x;y)]. \quad (27)$$

Although conceivably the IMS procedure could involve an indefinite number of iterations, computer simulations suggest that the procedure typically converges within a few iterations. This is explained by the fact that the noisy channel outputs with greatest contribution to the test statistic for a given bit are localized to the region surrounding that bit. When the convergence criterion of step 112 is met, then the IMS procedure has completed its detection of the 2-D ISI channel. The IMS procedure then proceeds to step 114 in which result values $\hat{a}_{x,y}$ are determined, which are intended to be representative of the values $a_{x,y}$ that were initially input to the channel. Each of the result values $\hat{a}_{x,y}$ is determined based upon all of the revised probability values (as combined/substituted due to step 110) that correspond to a respective one of the original channel values $c_{x,y}$ (or probability values $l_{x,y}$).

Thus, as illustrated in FIG. 10, for a 2-D ISI channel of extent two and assuming the initial matrix 60 of FIG. 8 (and matrix 65 of FIG. 9), the result value $\hat{a}_{1,1}$ corresponding to the channel value $c_{1,1}$ (and the probability value $l_{1,1}$) would be based upon each of the revised probability values corresponding to that channel value, namely the two values 76 and 78, as indicated by the connection of those values by way of the connection lines 90 to a respective bit node 96. Likewise, as illustrated in FIG. 11, for a 2-D ISI channel of extent three and assuming the initial matrix 60 of FIG. 8 (and matrix 65 of FIG. 9), the result value $\hat{a}_{4,5}$ corresponding to the channel value $c_{4,5}$ (and the probability value $l_{4,5}$) would be based upon each of the revised probability values corresponding to that channel value, namely the three values 87, 88 and 89, as indicated by the connection of those values by way of the connection lines 92 to a respective bit node 98.

The calculation of the result values based upon the corresponding revised probability values can be the normalized product of those values, although other manners of computing the result values from the revised probability values can also be used in alternate embodiments. Upon determination of the result values, those values are then output (e.g., for transmission, storage, display, or other use) and the IMS procedure is completed, at a step 116. It should again be emphasized that, although FIGS. 10 and 11 show the IMS procedure for detecting the 2-D ISI channel to operate by applying the BCJR algorithm to pairs or triplets of rows (in the cases of 2-D ISI channels of extent two and extent three), the procedure can similarly be operated in a manner in which the BCJR algorithm is applied to sets of rows greater than merely two or three rows.

Joint 2-D Channel Equalization and Coding

Figure 12:
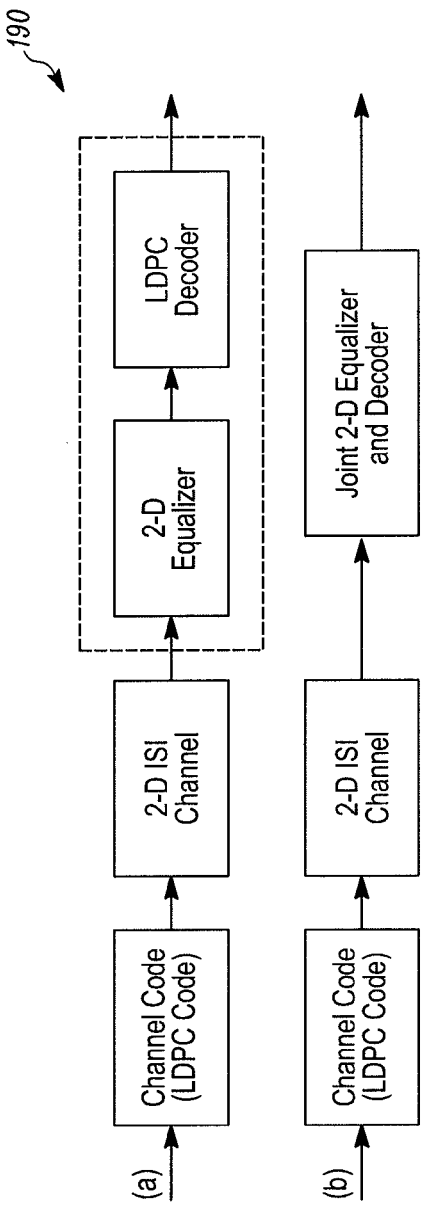
FIG. 12 is a block diagram showing components of an exemplary system for both performing decoding of a 2-D ISI channel in accordance with the preferred IMS procedure of FIG. 7 and additionally performing equalization.

It is likely that future 2-D recording systems will employ error control codes to increase the achievable recording density on a given ISI channel. The near-capacity performance with reasonable decoding complexity of low density parity check (LDPC) codes and Turbo codes make them attractive candidates for the system. An important feature of these code ensembles are the availability of message passing decoding procedures, which while not optimal, provide a good trade-off of decoding performance and computational complexity. As the IMS procedure also produces soft outputs from soft inputs, it can be incorporated into an iterative joint channel-code decoder as illustrated by a signal flow diagram 190 in FIG. 12.

Figure 13:
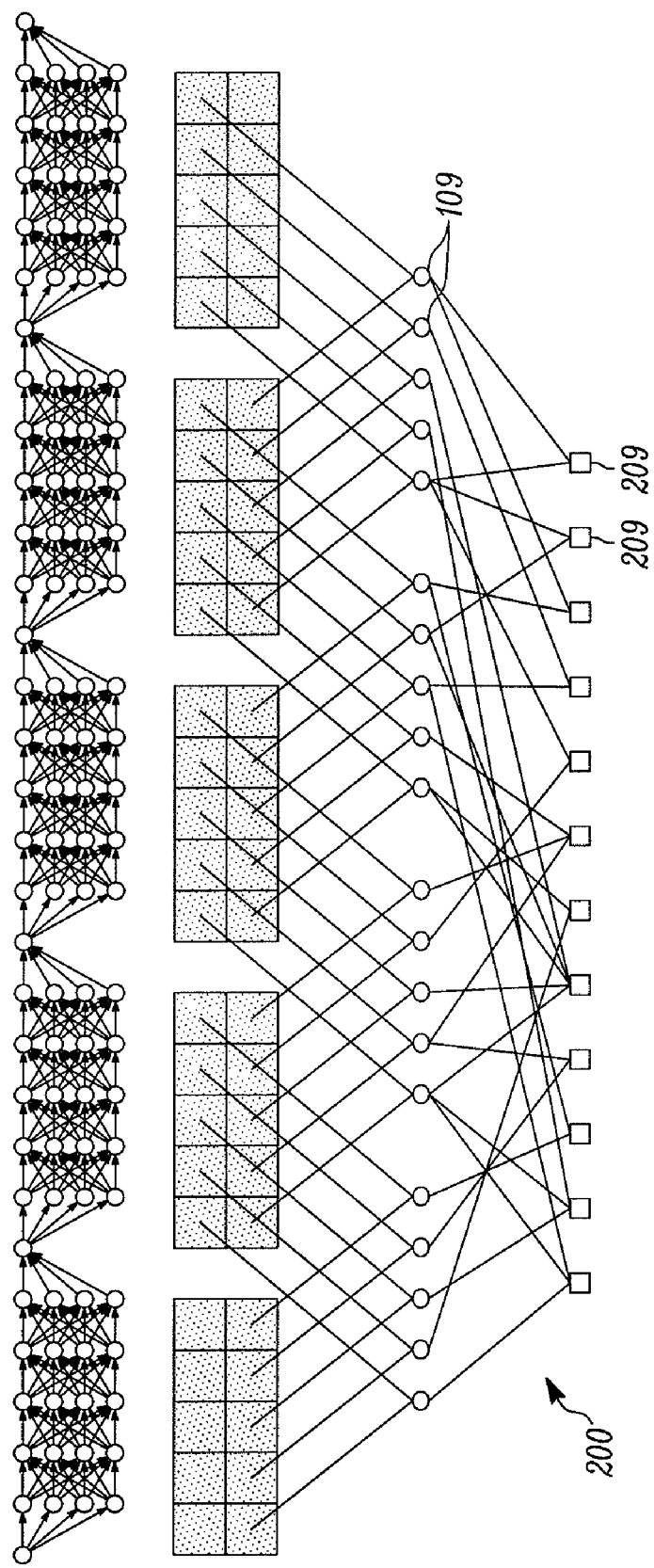
FIG. 13 is the graph of FIG. 10, modified to additionally show implementation of an LDPC coding step.

Additionally, referring to FIG. 13, a decoding graph 200 produced by combining a $1^{st}$ order 2-D ISI channel with an irregular LDPC code is shown. The graph 200 contains the same bit nodes 109 as in FIG. 10 along with the addition of check nodes 209 enforcing LDPC constraints. Message passing on the graph 200 proceeds in typical belief propagation fashion, in which the message propagated along an edge exiting a node is formed by combining the incoming messages excluding the message on that one edge. The combining function for the check nodes assumes independent incoming messages. A variety of message passing schedules, (e.g., a single iteration of the IMS procedure for every iteration through the LDPC check nodes) can be utilized to modify the procedure's convergence. It is also expected that the performance could be improved if the LDPC code degree distributions were optimized for the 2-D ISI channel.

It is specifically intended that the present invention not be limited to the embodiments and illustrations contained herein, but include modified forms of those embodiments including portions of the embodiments and combinations of elements of different embodiments as come within the scope of the following claims. For example, although the above discussion largely addresses embodiments of the invention in which the BCJR algorithm is employed, in alternate embodiments, any of a variety of other a-postiori probability ("app") algorithms other than the BCJR algorithm (which is the most exact of the app algorithms) can also be employed. Further, for example, some of these app algorithms could be approximations of the BCJR algorithm, for example, the soft output Viterbi algorithm ("SOVA").

I claim:

1. A method of processing channel values received from a two-dimensional (2-D) inter-symbol interference (ISI) channel to which was provided a plurality input values, the channel values being associated with a plurality of rows that together form a matrix, the method comprising:
   (a) computing, by way of a processing device, a plurality of sets of combination values respectively based upon a plurality of overlapping subsets of the rows of the channel values;
   (b) applying an a-postiori probability (app) algorithm to the plurality of sets of combination values; and
   (c) producing result values that are indicative of the input values that gave rise to the channel values, wherein the result values are produced based upon results from the application of the app algorithm.

2. The method of claim 1, wherein the computing of the plurality of sets of combination values includes calculating a plurality of rows of probability values based upon the plurality of rows of the channel values.

3. The method of claim 2, wherein the calculating of the plurality of rows of the probability values includes calculating a plurality of log-likelihood ratio values based upon the plurality of channel values.

4. The method of claim 1, wherein each of the overlapping subsets of the rows of the channel values includes a different respective subset of the channel values.

5. The method of claim 4, wherein at least one of the overlapping subsets of the rows of the channel values includes a set of assumed channel values corresponding to locations outside of the matrix.

6. The method of claim 1, wherein the 2-D ISI channel is of extent two, and wherein each of the overlapping subsets of the rows of the channel values includes a respective subset of values based upon at least one of (i) a first plurality of the channel values corresponding to two of the rows of the channel values and (ii) a second plurality of the channel values corresponding to one of the rows of the channel values and a third plurality of assumed channel values.

7. The method of claim 1, wherein the 2-D ISI channel is of extent three, and wherein each of the overlapping subsets of the rows of the channel values includes a respective subset of values based upon at least one of (i) a first plurality of the channel values corresponding to three of the rows of the channel values and (ii) a second plurality of the channel values corresponding to at least one of the rows of the channel values and a third plurality of assumed channel values.

8. The method of claim 1, wherein the computing of the plurality of sets of combination values includes determining a plurality of symbol probability values, and wherein at least one of the symbol probability values is based upon at least two probability values that are respectively functionally related to at least two of the channel values that are associated with adjacent rows of the matrix.

9. The method of claim 1, further comprising resolving the results of the applying of the app algorithm into a plurality of sets of rows of revised probability values corresponding to the plurality of overlapping subsets of rows, wherein the revised probability values correspond to positions in the matrix associated with the channel values, and wherein there are at least two of the revised probability values that correspond to each respective position in the matrix.

10. The method of claim 9, wherein at least one of a combination operation and a substitution operation is applied with respect to the revised probability values.

11. The method of claim 10, wherein the 2-D ISI channel is of extent two, wherein after the resolving of the results there are two revised probability values that correspond to each respective position in the matrix, and wherein the at least one operation includes substituting at least some of the revised probability values of the different sets of rows with one another.

12. The method of claim 10, wherein the 2-D ISI channel is of extent three, wherein after the resolving of the results there are three revised probability values that correspond to each respective position in the matrix, and wherein the at least one operation includes substituting at least some of the revised probability values with sums of others of the revised probability values that correspond to the same respective positions in the matrix.

13. The method of claim 9, further comprising determining whether at least one convergence criterion has been met.

14. The method of claim 13, wherein the determining of whether the convergence criterion has been met includes comparing at least two values that are functionally related to at least two of the revised probability values that correspond to the same position in the matrix.

15. The method of claim 13, wherein if it is determined that the convergence criterion has not been met, reperforming at least (a), (b) and the resolving of the results of the applying of the app algorithm.

16. The method of claim 15, wherein the determining of whether the convergence criterion has been met depends upon whether respective signs of a plurality of values functionally related to the revised probability values have remained constant since a previous iteration.

17. The method of claim 13, wherein when it is determined whether the convergence criterion has been met, the producing of the result values includes calculating averages of values based upon the revised probability values, wherein each of the averages of values is based upon a respective set of the revised probability values that correspond to the same position in the matrix.

18. The method of claim 1, wherein the app algorithm is a BCJR algorithm, and wherein the method is performed as part of a joint equalization and decoding procedure, and wherein the decoding procedure employs an LDPC code.

19. For use in detecting a two-dimensional (2-D) ISI channel, a computer readable storage medium including computer executable code for instructing a computer to: (a) compute a plurality of sets of combination values respectively based upon a plurality of overlapping subsets of rows of channel values received from the 2-D ISI channel; (b) apply an app algorithm to the plurality of sets of combination values; and (c) produce result values that are indicative of input values that gave rise to the channel values, wherein the result values are produced based upon results from the application of the app algorithm.

20. The computer readable storage medium of claim 19, wherein the computer executable code is further for instructing the computer to: (d) prior to (a), compute initial probability values based upon the channel values, wherein the computing of the plurality of sets of combination values is performed based upon the initial probability values.

21. The computer readable storage medium of claim 19, wherein the computer executable code is further for instructing the computer to, prior to (c): (d) resolve results of the applying of the app algorithm into a plurality of bands of rows of revised probability values; (e) perform a substitution operation in relation to the revised probability values; and (f) repeat (a)-(e) until a convergence criterion is met; whereby the result values are obtained when the convergence criterion is met.

22. A system for detecting a 2-D ISI channel having the computer readable storage medium of claim 19, wherein the system further comprises:
an input port for receiving the channel values from the 2-D ISI channel;
a computer processing device for performing the computer executable code when the channel values are received; and
an output port by which the result values are communicated to allow for at least one of transmission, storage, display, or other usage of the final result values.

23. A memory storage system including the system for detecting the 2-D ISI channel of claim 22, wherein the memory storage system further includes at least one two-dimensional memory storage element.

24. The computer readable storage medium of claim 19, wherein the computer executable code is further for instructing the computer to perform a decoding procedure.

25. A two-dimensional (2-D) memory storage and retrieval system, the system comprising:
a 2-D memory storage device; and
means for processing data received from the 2-D memory storage device,
wherein the means for processing the data is capable of removing at least some 2-D ISI from the data by performing at least one of a 2-D decision feedback equalization (DFE) procedure, a Turbo Product Equalization (TPE) procedure, a Turbo Decision-Feedback BCJR (DF-BCJR) Equalization procedure, a feed-forward multi-strip equalization procedure, and an iterative multi-strip equalization procedure wherein the means for processing performs at least one of the feedforward multi-strip equalization procedure and the iterative multi-strip equalization procedure, which includes applying an a-postiori probability (app) algorithm to data based upon a plurality of multi-row bands of data.

26. The 2-D memory storage and retrieval system of claim 25, wherein the 2-D memory storage device is selected from the group consisting of a magnetic storage device, an optical storage device, and a holographic storage device.

27. A two-dimensional (2-D) data communication system, the system comprising:
a 2-D communication channel; and
a processing device capable of processing data received from the 2-D communication channel, wherein the processing device is capable of removing at least some 2-D ISI from the data by performing at least one of a 2-D decision feedback equalization (DFE) procedure, a Turbo Product Equalization (TPE) procedure, a Turbo Decision-Feedback BCJR (DF-BCJR) Equalization procedure, a feed-forward multi-strip equalization procedure, and an iterative multi-strip equalization procedure, wherein the processing device performs at least one of the feedforward multi-strip equalization procedure and the iterative multi-strip equalization procedure, which includes applying an a-postiori probability (app) algorithm to data based upon a plurality of multi-row bands of data.

* * * * *

UNITED STATES PATENT AND TRADEMARK OFFICE
CERTIFICATE OF CORRECTION

PATENT NO. : 7,978,797 B2   Page 1 of 1
APPLICATION NO. : 12/478179
DATED : July 12, 2011
INVENTOR(S) : Marcus Marrow It is certified that error appears in the above-identified patent and that said Letters Patent is hereby corrected as shown below:

In Column 8, Line 20, please delete "$c_k$" and insert -- $\overline{c_k}$ --, therefor.

In Column 12, Line 18, please delete "$r^{(1)}$" and insert -- $\underline{r}^{(1)}$ --, therefor.

In Column 12, Line 29, in Equation (23), please delete "$r^{(1)}(x+v;y)\}$" and insert -- $\underline{r}^{(1)}(x+v;y)\}$ --, therefor.

In Column 14, Line 62, in Equation (26), please delete "$|c_x s^{(1)}(x;y)]$" and insert -- $|c_x \underline{s}^{(1)}(x;y)]$ --, therefor.

Signed and Sealed this
Sixth Day of March, 2012

David J. Kappos
*Director of the United States Patent and Trademark Office*